United States Patent
Guo et al.

(10) Patent No.: US 11,535,708 B2
(45) Date of Patent: Dec. 27, 2022

(54) PREPARATION METHOD FOR POLYOL AND APPLICATION OF POLYOL IN MAKING POLYURETHANE

(71) Applicant: NANJING TECH UNIVERSITY, Nanjing (CN)

(72) Inventors: Kai Guo, Nanjing (CN); Zheng Fang, Nanjing (CN); Man Yang, Nanjing (CN); Junjie Tao, Nanjing (CN); Ning Zhu, Nanjing (CN); Wei He, Nanjing (CN); Kequan Chen, Nanjing (CN); Pingkai Ouyang, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 260 days.

(21) Appl. No.: 16/999,932

(22) Filed: Aug. 21, 2020

(65) Prior Publication Data
US 2020/0377656 A1     Dec. 3, 2020

(30) Foreign Application Priority Data

Apr. 23, 2020    (CN) .......................... 2020103260788

(51) Int. Cl.
| | | |
|---|---|---|
| *C08G 71/04* | (2006.01) | |
| *C08G 18/32* | (2006.01) | |
| *C08G 18/76* | (2006.01) | |
| *C08G 18/64* | (2006.01) | |
| *C08G 18/08* | (2006.01) | |
| *C08G 18/48* | (2006.01) | |
| *C08G 18/10* | (2006.01) | |
| *C08G 18/36* | (2006.01) | |
| *C08G 18/18* | (2006.01) | |
| *C08G 18/67* | (2006.01) | |
| *C08G 65/26* | (2006.01) | |
| *C08G 18/20* | (2006.01) | |
| *C08G 18/16* | (2006.01) | |
| *B01J 19/00* | (2006.01) | |
| *C08G 18/24* | (2006.01) | |

(52) U.S. Cl.
CPC .......... *C08G 71/04* (2013.01); *B01J 19/0093* (2013.01); *C08G 18/08* (2013.01); *C08G 18/10* (2013.01); *C08G 18/165* (2013.01); *C08G 18/1833* (2013.01); *C08G 18/2081* (2013.01); *C08G 18/246* (2013.01); *C08G 18/3203* (2013.01); *C08G 18/3206* (2013.01); *C08G 18/36* (2013.01); *C08G 18/4895* (2013.01); *C08G 18/6407* (2013.01); *C08G 18/6795* (2013.01); *C08G 18/7671* (2013.01); *C08G 18/7685* (2013.01); *C08G 65/2609* (2013.01); *B01J 2219/0081* (2013.01); *B01J 2219/00781* (2013.01); *B01J 2219/00889* (2013.01); *B01J 2219/00961* (2013.01); *B01J 2219/00984* (2013.01)

(58) Field of Classification Search
CPC ................ C08G 71/04; C08G 18/3206; C08G 18/7685; C08G 18/10; C08G 18/165; C08G 18/1833; C08G 18/2081; C08G 18/246; C08G 18/4895; C08G 18/7671; C08G 65/2609; C08G 18/6795; C08G 18/08; C08G 18/3203; C08G 18/36; C08G 18/6407; B01J 19/0093; B01J 2219/00889; B01J 2219/00781; B01J 2219/0081; B01J 2219/00961; B01J 2219/00984

See application file for complete search history.

(56) References Cited

U.S. PATENT DOCUMENTS

2016/0311789 A1* 10/2016 Guo ...................... C07D 301/16

FOREIGN PATENT DOCUMENTS

CN         109369871 A  *  2/2019  ............. C08G 18/08

* cited by examiner

*Primary Examiner* — Rabon A Sergent
(74) *Attorney, Agent, or Firm* — CBM Patent Consulting, LLC (57) ABSTRACT

A method for preparing a polyol comprises the following steps of: (1) dissolving 2,3-epoxybutane and an acid catalyst in an inert solvent to obtain a solution A; dissolving triethylene glycol in an inert solvent to obtain a solution B; and dissolving epoxy vegetable oil in an inert solvent to obtain a solution C; (2) respectively and simultaneously pumping the solutions A and B into a first micromixer for mixing; (3) pumping the solution C and an effluent of the first microreactor into a second micromixer for mixing while carrying out step (2); and (4) dissolving the vegetable oil polyol in an inert solvent to obtain a solution D; dissolving epoxypropane and an alkaline catalyst in an inert solvent to obtain a solution E; and pumping the solution D and the solution E into a tank reactor for reaction, thereby obtaining the polyol.

5 Claims, 1 Drawing Sheet

PREPARATION METHOD FOR POLYOL AND APPLICATION OF POLYOL IN MAKING POLYURETHANE

This application claims priority to Chinese Patent Application Ser. No. CN2020103260788 filed on 23 Apr. 2020.

TECHNICAL FIELD

The present invention relates to a polyurethane polyol and a preparation method and application thereof. The polyurethane polyol is used for preparing a polyurethane elastomer.

BACKGROUND

Polyurethane is a polymer with a carbamate segment repetitive structure unit formed after the reaction of isocyanate and polyol. Polyurethane products are divided into foaming products and non-foaming products. The foaming products include soft, hard and semi-hard polyurethane foamed plastics. The non-foaming products include coatings, adhesives, synthetic leather, elastomers and elastic fibers. Polyurethane materials have excellent properties, wide applications and many kinds of products, among which the polyurethane foamed plastics is the most widely used.

There are three types of polyols used in the polyurethane, one is a polymer obtained by polymerization with epoxyethane, epoxypropane or epoxybutane by using polyol or organic amine as an initiator, which is called a polyether polyol; the other one is a modified grafted polyether polyol based on the polyether polyol and prepared by bulk polymerization of a vinyl monomer in polyol, which is called a polymer polyol, and is often used together with the polyether polyol; and the third one is a polyol polymerized by ring opening of tetrahydrofuran. However, with the decreasing reserves of petrochemical resources, the price of petrochemical products continues to rise and it is inconvenient to purchase the petrochemical products, which directly affects the production of products. Therefore, it is an important research orientation of polyols in recent years to seek a new resource that makes the products more economical and environmentally friendly, and reduces the dependence on the petrochemical products at the same time.

All the traditional elastomer polyether polyols use glycerine, diglycol and propylene glycol and other polyhydroxy compounds as initiators, and use epoxypropane and epoxyethane as chain extenders, among which more than 98% are petroleum derivatives. At present, people want to reduce dependence on petroleum and improve the environment. Compared with petroleum polyols, energy consumption of biomass polyols is reduced by 23%, non-renewable resources consumption of the biomass polyols is reduced by 61%, and greenhouse gas emissions of the biomass polyols is reduced by 36%. It has become an important development orientation of polyurethane materials to replace the petroleum polyols with the biomass polyols to produce polyurethane. As the cheapest and abundant vegetable oil, soybean oil is made into a soybean oil-based polyol by molecular modification, and may be used for synthesizing polyurethane. Polyurethane products produced thereby are not only safe and sanitary, but also show better mechanical properties, thermal stability and chemical resistance.

It is a common method to develop bio-based polyurethane polyol by using vegetable oil as a renewable raw material and using double bonds in a structure of the vegetable oil to transform hydroxyl functional groups. The vegetable oil is low in price and stable in source. Triglyceride and long chain groups thereof in the structure of the vegetable oil can replace petrochemical polyol. However, at present, the main problems in this field comprise the problems that the functional groups cannot be effectively transformed due to complicated raw material components and cross-linking side reactions easily caused by functional group transformation, as well as the problem that the foaming application is limited due to a wide distribution of molecular weights generated by cross-linking and a high viscosity of product. In addition, there is a multi-phase system in a reaction between the vegetable oil and multiple alcohol reagents, which has a low mass transfer efficiency. There is a contradiction between demands for an intensity and a time of the reaction and uncontrollable side reactions in the process, which greatly affects the product quality, so that a market potential of the product is limited. Meanwhile, the summary of a structure-activity relationship is not enough due to unclear product structure and uncontrollable process. Therefore, there is still much work to be done in this field, and many technical bottlenecks need to be broken. Developing new structures and adopting new reaction modes to realize effective control of the reaction process and accurate construction of the structure are the keys and difficulties in subsequent research and development. At the same time, the development of vegetable oil polyurethane polyol products has a broad market prospect, which will definitely break through the technical bottlenecks and break a breakthrough for the development of bio-based materials, and is expected to become a new economic growth point.

The application of the invention CN109369871A discloses a preparation method of a polyurethane polyol applied to a slow-rebound flexible polyurethane foam material, which includes the steps of preparing a hydroxyl compound from tris-(1-aziridinyl)phosphine oxide and other diols and halohydrins, and then carrying out ring-opening reaction on the hydroxyl compound and epoxy vegetable oil under the action of a catalyst to obtain a vegetable oil polyol. Halohydrin molecules are prone to cross-side reactions, and chlorine exists in by-products, which will also pollute the environment. Therefore, it is necessary to develop a new preparation process of the polyurethane polyol to solve problems thereof.

SUMMARY

Objective of the present invention: one technical problem to be solved by the present invention is to provide a polyurethane polyol aiming at the defects of the prior art, so as to overcome the problem that the current preparation of polyurethane polyol is depending on petrochemical resources, such that green and renewable epoxy vegetable oil resources can be introduced, and to prepare activity difference molecules with the same functional groups as much as possible on the basis of structure simulation and design, reduce cross-linking and decrease functionality utilization rate as much as possible, take economic effects into account, and construct a high-quality vegetable oil polyurethane polyol by using cheap reagents.

Another technical problem to be solved by the present invention is to provide a preparation method of the above polyurethane polyol aiming at the problems of crosslinking and high viscosity of products since the existing ring-opening reaction process of the epoxy vegetable oil is uncontrollable.

A final technical problem to be solved by the present invention is to provide an application of the above-mentioned polyurethane polyol.

In order to solve the above-mentioned problems, the present invention discloses a preparation method of a polyurethane polyol, which comprises the following steps of:

(1) dissolving 2,3-epoxybutane and an acid catalyst in an inert solvent to obtain a solution A; dissolving triethylene glycol in an inert solvent to obtain a solution B; and dissolving epoxy vegetable oil in an inert solvent to obtain a solution C;

(2) respectively and simultaneously pumping the solution A and the solution B into a first micromixer in a microchannel reaction device for mixing, and then introducing the mixture into a first microreactor for reaction to obtain a reaction solution containing a hydroxyl compound;

(3) respectively and simultaneously pumping the solution C and an effluent of the first microreactor into a second micromixer in the microchannel reaction device for mixing while carrying out step (2), and then introducing the mixture into a second microreactor for ring-opening reaction to obtain a reaction solution containing a vegetable oil polyol, and then separating the solution to obtain the vegetable oil polyol; and (4) dissolving the vegetable oil polyol obtained in step (3) in an inert solvent to obtain a solution D; dissolving epoxypropane and an alkaline catalyst in an inert solvent to obtain a solution E; and respectively and simultaneously pumping the solution D and the solution E into a tank reactor for addition polymerization reaction, thereby obtaining the polyurethane polyol. A measure of controlling a flow rate and a concentration of reactants during pumping is employed to effectively avoid the occurrence of crosslinking.

In step (1), the acid catalyst is any one or combination of sulfuric acid, hydrochloric acid, phosphoric acid, fluoroboric acid, aluminum chloride and ferric chloride, and is preferably fluoroboric acid.

In step (1) and step (4), the inert solvent is any one or combination of dichloromethane, chloroform, carbon tetrachloride, dichloroethane and xylen, and is preferably dichloroethane.

In step (1), a molar ratio of the 2,3-epoxybutane to the acid catalyst in the solution A is (1.0 to 1.25):(0.1 to 0.2), and preferably 1:0.16; and a concentration of the 2,3-epoxybutane is 2.20 mmol/mL to 4.50 mmol/mL.

In step (1), a concentration of the triethylene glycol in the solution B is 1.20 mmol/mL to 3.0 mmol/mL.

In step (1), the epoxy vegetable oil in the solution C is an epoxy soybean oil or epoxy cotton oil prepared according to the method disclosed in CN104292187A, and an epoxy value of the epoxy vegetable oil is 6.0 to 6.7 (i.e., an epoxy content in each 100 g of epoxy resin is 6.0 to 6.7); and a concentration of the epoxy vegetable oil is 0.15 mmol/mL to 0.40 mmol/mL (concentration of epoxy soybean oil= (amount of substance of epoxy soybean oil substance)/ (volume of epoxy soybean oil+volume of solvent)).

Figure 1:
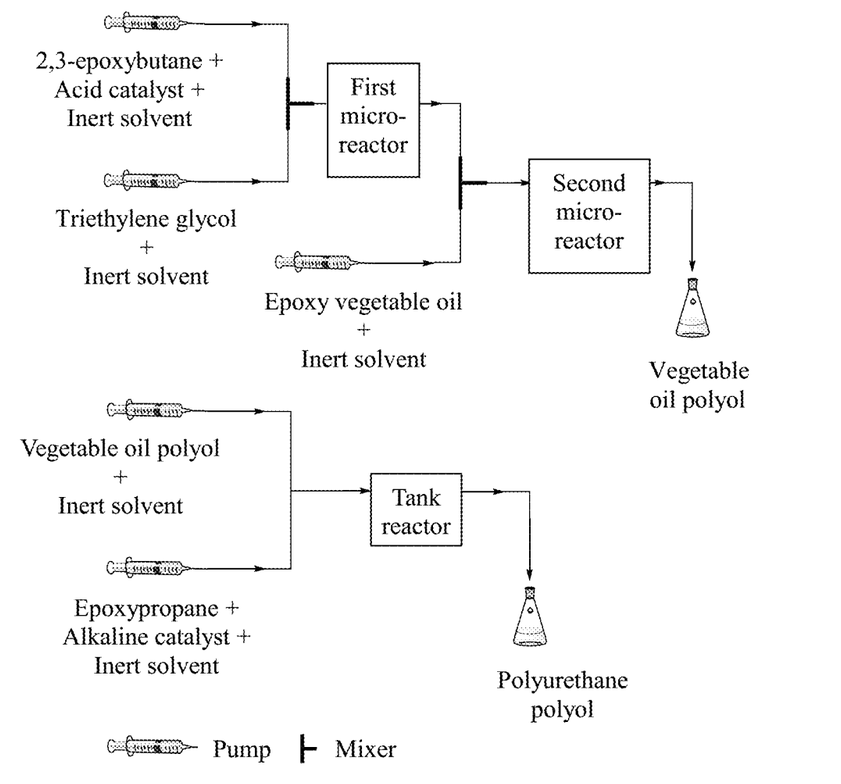
FIG. 1 is a schematic diagram of the present invention.

In step (2), the microchannel reaction device comprises a first feed pump, a second feed pump, a third feed pump, a first micromixer, a second micromixer, a first microreactor, a second microreactor and a receiver; the first feed pump and the second feed pump are connected to the first micromixer in a parallel manner through a pipeline, the first micromixer is connected with the first microreactor in series, a discharge port of the first microreactor and the third feed pump are connected to the second micromixer in a parallel manner, the second micromixer is sequentially connected with the second microreactor and the receiver in series, and the connection is implemented through a pipeline; the temperature is controlled by heating in an oil bath pan; and the pump is an accurate pump with low pulsation.

Models of the first micromixer and the second micromixer are preferably slit plate mixer LH25; and models of the first microreactor and the second microreactor are preferably Vapotech. The first microreactor and the second microreactor are both connected with a back pressure valve to prevent gasification.

In step (2), a pumping rate ratio of the solution A to the solution B is 1:0.6 to 3.5, a reaction temperature is 70° C. to 100° C. (preferably 80° C.), and a reaction residence time is 5 minutes to 10 minutes (preferably 7 minutes).

Preferably, a volume of the first microreactor is 2 mL to 20 mL (preferably 8 mL), a flow rate of pumping the solution A into the first micromixer is 0.2 mL/min to 1.0 mL/min (preferably 0.5 mL/min), and a flow rate of pumping the solution B into the first micromixer is 0.2 mL/min to 1.0 mL/min (preferably 0.5 mL/min).

In step (3), a pumping rate ratio of the effluent of the first microreactor to the solution C is controlled to be 1:0.5 to 2.0; preferably, a molar ratio of the triethylene glycol to the epoxy vegetable oil is controlled to be 3.2 to 3.75:1 while controlling the rate; a reaction temperature is 80° C. to 140° C. (preferably 120° C.), and a reaction residence time is 5 minutes to 15 minutes (preferably 10 minutes).

Preferably, a volume of the second microreactor is 4 mL to 60 mL (preferably 20 mL); and a flow rate of pumping the solution C into the second micromixer is 0.4 mL/min to 2.0 mL/min (preferably 1.0 mL/min).

In step (3), the separating is to stand an effluent of the second microreactor for stratification, collect an oleic phase, wash the oleic phase to neutrality, and then obtain the vegetable oil polyol by liquid separation and rotary evaporation.

In step (4), a concentration of vegetable oil polyol in the solution D is 0.10 mmol/mL to 0.25 mmol/mL in the solution E, a concentration of the epoxypropane is 3.0 mmol/mL to 6.50 mmol/mL, and a molar ratio of the epoxypropane to an epoxy group in the epoxy vegetable oil is 5 to 15:1 (preferably 10:1); and a mass percentage of the alkaline catalyst to the epoxy vegetable oil is 0.02% to 0.1% (preferably 0.8%).

Concentration of vegetable oil polyol=(mass of vegetable oil polyol)/(volume of vegetable oil polyol+volume of solvent); wherein, the mass of the vegetable oil polyol is calculated according to the dosage of the epoxy vegetable oil in raw materials.

In step (4), the alkaline catalyst is any one or a combination of caesium carbonate, sodium carbonate, potassium carbonate, sodium hydroxide, potassium hydroxide, sodium bicarbonate, magnesium carbonate, triethylamine, pyridine and sodium methoxide, and is preferably caesium carbonate.

In step (5), a pumping rate ratio of the solution D to the solution E is 1.5 to 6.5:1; and the reaction is carried out at 80° C. to 150° C. (preferably 130° C.) for 2.5 hours to 3 hours.

Preferably, a flow rate of pumping the solution D into the tank reactor is 10.0 mL/min to 50.0 mL/min, and a flow rate of pumping the solution E into the tank reactor is 10.0 mL/min to 50.0 mL/min.

After the reaction in step (5) is finished, a product in the tank reactor is stood for stratification, and an oleic phase is collected and washed with an acid for neutralization until a pH value is 6.5 to 7.5, then liquid separation is carried out, and an organic phase is subjected to rotary evaporation, and then dried to obtain the polyurethane polyol; the acid is one or more of a hydrochloric acid, a sulfuric acid and a phosphoric acid, preferably a hydrochloric acid, and a mass percentage concentration of the hydrochloric acid is 5%.

The polyurethane polyol prepared by the above-mentioned method is also within the scope of protection of the present invention.

An application of the above-mentioned polyurethane polyol in preparing a polyurethane elastomer is also within the scope of protection of the present invention.

A preparation method of the polyurethane elastomer refers to the prior art, and a preferred method is as follows: under the protection of nitrogen, the polyurethane elastomer is prepared by a prepolymer method, the vegetable oil polyol prepared by the present invention is mixed with water, silicone oil, a cell-opening agent, a catalyst A-33, a catalyst A-1 and a catalyst T-12, and then 4,4'-diphenylmethane diisocyanate is added for reaction at 70° C. to 90° C. for 1.5 hours to 2.5 hours. A free NCO content in the reaction system is determined by a di-n-butylamine method, and then 1,4-butylene glycol is added according to a chain extension coefficient of 0.95. After stirring and mixing evenly, the mixture is poured into a flat steel mold at 90° C. to 120° C., vulcanized and aged for 20 hours to 30 hours in an oven at 80° C. to 100° C. A mass ratio of the vegetable oil polyol to the water, the silicone oil, the cell-opening agent, the catalyst A-33, the catalyst A-1 and the catalyst T-12 is 1:0.015 to 0.025:0.005 to 0.015:0.015 to 0.025:0.002 to 0.004:0.0005 to 0.0015:0.00005 to 0.00007. A mass ratio of the vegetable oil polyol to the 4,4'-diphenylmethane diisocyanate is 1:0.7 to 1.05.

Beneficial effects: compared with the prior art, the present invention has the following advantages.

(1) A microchannel technology is employed in the present invention to prepare the low-viscosity polyurethane polyol, which has good quality and light color, and may be completely replace a traditional polyether polyol for preparing a polyurethane elastomer without being mixed with a petrochemical polyether polyol. (2) The present invention has the advantages of simple process, convenient operation, low energy consumption, few side reactions, high reaction efficiency as well as stable and controllable process, and the obtained product does not need further treatment, and has engineering enlargement potential.

DETAILED DESCRIPTION

The present invention can be better understood from the following embodiments. However, those skilled in the art will easily understand that the contents described in the embodiments are only used to illustrate the present invention, and should not and will not limit the present invention described in detail in the claims.

Related determination methods of the present invention on the prepared polyurethane polyol and polyurethane elastomer are as follows:

(1) determining a hydroxyl value according to GB/T 12008.3-2009;

(2) determining a viscosity according to GB/T 12008.7-2010;

(3) determining a tensile strength according to GB/T 24451-2009;

(4) determining an elongation percentage according to GB6344-2008;

(5) determining a compression set parameter according to GB6669-2008;

(6) determining a rebound performance according to GB6670-2008; and (7) determining a tear strength according to GB10808-2006.

Embodiment 1

(1) Preparation of polyurethane polyol 25.2 g of 2,3-epoxybutane and 12.30 g of fluoroboric acid aqueous solution (40 wt. %) were dissolved in 85 mL of dichloroethane to obtain a mixed solution A, 52.5 g of triethylene glycol was dissolved in 190 mL of dichloroethane to obtain a solution B, and 100 g of epoxy soybean oil (0.406 mol of epoxy group) was dissolved in 300 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.5 mL/min, 0.9 mL/min, 1.0 mL/min and 1.0 ml/min; a volume of the first microreactor in a microchannel reaction device was 10 mL, a reaction temperature was 80° C., and a reaction residence time was 7 minutes; a volume of the second microreactor in the microchannel reaction device was 20 mL, a reaction temperature was 120° C., and a reaction residence time was 10 minutes. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 600 mL of dichloroethane to obtain a solution D, and 235.8 g of epoxypropane and 0.2 g of caesium carbonate aqueous solution (40 wt. %) were dissolved in 800 mL of dichloroethane to obtain a solution E. The solution D and the solution E were respectively and simultaneously pumped into a tank reactor to stir at a reaction temperature of 130° C. for 3 hours, wherein flow rates of the solutions D and E were respectively 40 mL/min and 15 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 41 mgKOH/g and a viscosity of 710 mPa·s.

(2) Preparation of polyurethane elastomer

Under the protection of nitrogen, a polyurethane elastomer was prepared by a prepolymer method, 100 g of soybean-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then 100 g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a soybean oil-based polyurethane elastomer.

Embodiment 2

(1) Preparation of polyurethane polyol 25.2 g of 2,3-epoxybutane and 12.30 g of fluoroboric acid aqueous solution (40 wt. %) were dissolved in 85 mL of dichloroethane to obtain a mixed solution A, 48.0 g of triethylene glycol was dissolved in 180 mL of dichloroethane to obtain a solution B, and 100 g of epoxy soybean oil (0.418 mol of epoxy group) was dissolved in 370 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.5 mL/min, 1.0 mL/min, 1.0 mL/min and 1.30 mL/min; a volume of the first microreactor in a microchannel reaction device was 12 mL, a reaction temperature was 80° C., and a reaction residence time was 8 minutes; a volume of the second microreactor in the microchannel reaction device was 30 mL, a reaction temperature was 120° C., and a reaction residence time was 13 minutes. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 550 mL of dichloroethane to obtain a solution D, and 194.0 g of epoxypropane and 0.15 g of caesium carbonate aqueous solution (40 wt. %) were dissolved in 750 mL of dichloroethane to obtain a solution E. The solution D and the solution E were respectively and simultaneously pumped into a tank reactor to stir at a reaction temperature of 130° C. for 2.5 hours, wherein flow rates of the solutions D and E were respectively 48 mL/min and 15 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 47 mgKOH/g and a viscosity of 620 mPa·s.

(2) Preparation of polyurethane elastomer

Under the protection of nitrogen, a polyurethane elastomer was prepared by a prepolymer method, 100 g of soybean-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then 100 g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a soybean oil-based polyurethane elastomer.

Embodiment 3

(1) Preparation of polyurethane polyol 29.7 g of 2,3-epoxybutane and 14.50 g of fluoroboric acid aqueous solution (40 wt. %) were dissolved in 100 mL of dichloroethane to obtain a mixed solution A, 56.25 g of triethylene glycol was dissolved in 230 mL of dichloroethane to obtain a solution B, and 100 g of epoxy soybean oil (0.406 mol of epoxy group) was dissolved in 350 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.4 mL/min, 0.9 mL/min, 1.2 mL/min and 1.5 ml/min; a volume of the first microreactor in a microchannel reaction device was 12 mL, a reaction temperature was 80° C., and a reaction residence time was 9 minutes; a volume of the second microreactor in the microchannel reaction device was 35 mL, a reaction temperature was 120° C., and a reaction residence time was 12 minutes. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 600 mL of dichloroethane to obtain a solution D, and 188.6 g of epoxypropane and 0.25 g of caesium carbonate aqueous solution (40 wt. %) were dissolved in 700 mL of dichloroethane to obtain a solution E. The solution D and the solution E were respectively and simultaneously pumped into a tank reactor to stir at a reaction temperature of 130° C. for 3 hours, wherein flow rates of the solutions D and E were respectively 35 mL/min and 10 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 37 mgKOH/g and a viscosity of 770 mPa·s.

(2) Preparation of polyurethane elastomer

Under the protection of nitrogen, a polyurethane elastomer was prepared by a prepolymer method, 100 g of soybean-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then 100 g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a soybean oil-based polyurethane elastomer.

<center>Embodiment 4</center>

(1) Preparation of polyurethane polyol 27.72 g of 2,3-epoxybutane and 12.70 g of fluoroboric acid aqueous solution (40 wt. %) were dissolved in 90 mL of dichloroethane to obtain a mixed solution A, 52.5 g of triethylene glycol was dissolved in 170 mL of dichloroethane to obtain a solution B, and 100 g of epoxy cotton oil (0.375 mol of epoxy group) was dissolved in 370 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.5 mL/min, 0.9 mL/min, 1.0 mL/min and 1.50 mL/min; a volume of the first microreactor in a microchannel reaction device was 12 mL, a reaction temperature was 80° C., and a reaction residence time was 8 minutes; a volume of the second microreactor in the microchannel reaction device was 30 mL, a reaction temperature was 120° C., and a reaction residence time was 12 minutes. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 550 mL of dichloroethane to obtain a solution D, and 217.8 g of epoxypropane and 0.20 g of caesium carbonate aqueous solution (40 wt. %) were dissolved in 900 mL of dichloroethane to obtain a solution E. The solution D and the solution E were respectively and simultaneously pumped into a tank reactor to stir at a reaction temperature of 130° C. for 2.5 hours, wherein flow rates of the solutions D and E were respectively 35 mL/min and 15 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 35 mgKOH/g and a viscosity of 810 mPa·s.

(2) Preparation of polyurethane elastomer

Under the protection of nitrogen, a polyurethane elastomer was prepared by a prepolymer method, 100 g of cotton-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a cotton oil-based polyurethane elastomer.

<center>Embodiment 5</center>

(1) Preparation of polyurethane polyol 23.04 g of 2,3-epoxybutane and 11.24 g of fluoroboric acid aqueous solution (40 wt. %) were dissolved in 80 mL of dichloroethane to obtain a mixed solution A, 48.0 g of triethylene glycol was dissolved in 180 mL of dichloroethane to obtain a solution B, and 100 g of epoxy cotton oil (0.381 mol of epoxy group) was dissolved in 390 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.5 mL/min, 1.0 mL/min, 1.0 mL/min and 1.30 mL/min; a volume of the first microreactor in a microchannel reaction device was 12 mL, a reaction temperature was 80° C., and a reaction residence time was 8 minutes; a volume of the second microreactor in the microchannel reaction device was 25 mL, a reaction temperature was 120° C., and a reaction residence time was 10 minutes. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 600 mL of dichloroethane to obtain a solution D, and 177.2 g of epoxypropane and 0.15 g of caesium carbonate aqueous solution (40 wt. %) were dissolved in 580 mL of dichloroethane to obtain a solution E. The solution D and the solution E were respectively and simultaneously pumped into a tank reactor to stir at a reaction temperature of 130° C. for 3 hours, wherein flow rates of the solutions D and E were respectively 15 mL/min and 50 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 40 mgKOH/g and a viscosity of 690 mPa·s.

(2) Preparation of polyurethane elastomer

Under the protection of nitrogen, a polyurethane elastomer was prepared by a prepolymer method, 100 g of cotton-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a cotton oil-based polyurethane elastomer.

Embodiment 6

(1) Preparation of polyurethane polyol 25.2 g of 2,3-epoxybutane and 12.30 g of fluoroboric acid aqueous solution (40 wt. %) were dissolved in 85 mL of dichloroethane to obtain a mixed solution A, 52.5 g of triethylene glycol was dissolved in 85 mL of dichloroethane to obtain a solution B, and 100 g of epoxy soybean oil (0.406 mol of epoxy group) was dissolved in 165 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.5 mL/min, 0.5 mL/min, 1.0 mL/min and 1.0 mL/min; a volume of the first microreactor in a microchannel reaction device was 8 mL, a reaction temperature was 80° C., and a reaction residence time was 7 minutes; a volume of the second microreactor in the microchannel reaction device was 20 mL, a reaction temperature was 120° C., and a reaction residence time was 10 minutes. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 270 mL of dichloroethane to obtain a solution D, and 235.8 g of epoxypropane and 0.2 g of caesium carbonate aqueous solution (40 wt. %) were dissolved in 800 mL of dichloroethane to obtain a solution E. The solution D and the solution E were respectively and simultaneously pumped into a tank reactor to stir at a reaction temperature of 130° C. for 3 hours, wherein flow rates of the solutions D and E were respectively 30 mL/min and 15 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 45 mgKOH/g and a viscosity of 690 mPa·s.

(2) Preparation of polyurethane elastomer

Under the protection of nitrogen, a polyurethane elastomer was prepared by a prepolymer method, 100 g of soybean-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then 100 g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a soybean oil-based polyurethane elastomer.

Comparative Example 1

(1) Preparation of polyurethane polyol 31.5 g of 2,3-epoxybutane and 15.37 g of fluoroboric acid aqueous solution (40 wt. %) were dissolved in 125 mL of dichloroethane to obtain a mixed solution A, 52.5 g of triethylene glycol was dissolved in 200 mL of dichloroethane to obtain a solution B, and 100 g of epoxy soybean oil (0.406 mol of epoxy group) was dissolved in 350 mL of dichloroethane to obtain a solution C. The mixed solution A and the solution B were respectively and simultaneously pumped into a tank reactor to stir, wherein flow rates of the solutions A and B were respectively 8 mL/min and 15 mL/min, a reaction temperature was 80° C., and the reaction lasted for 1.5 hours. After the reaction was finished, the solution C was added into the tank reactor, wherein a flow rate of the solution C was 30 mL/min, the temperature was raised to 120° C., and the reaction lasted for 2.5 hours. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 550 mL of dichloroethane to obtain a solution D, and 188.6 g of epoxypropane and 0.25 g of caesium carbonate aqueous solution (40 wt. %) were dissolved in 700 mL of dichloroethane to obtain a solution E. The solution D and the solution E were respectively and simultaneously pumped into a tank reactor to stir at a reaction temperature of 120° C. for 3 hours, wherein flow rates of the solutions D and E were respectively 30 mL/min and 10 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 74 mgKOH/g and a viscosity of 2120 mPa·s.

(2) Preparation of polyurethane plastomer

Under the protection of nitrogen, a polyurethane elastomer was prepared by a prepolymer method, 100 g of soybean-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then 100 g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a soybean oil-based polyurethane elastomer.

Comparative Example 2

(1) Preparation of polyurethane polyol 25.34 g of 2,3-epoxybutane and 12.29 g of fluoroboric acid aqueous solution (40 wt. %) were dissolved in 100 mL of dichloroethane to obtain a mixed solution A, 48.0 g of triethylene glycol was dissolved in 150 mL of dichloroethane to obtain a solution B, and 100 g of epoxy cotton oil (0.375 mol of epoxy group) was dissolved in 350 mL of dichloroethane to obtain a solution C. The mixed solution A and the solution B were respectively and simultaneously pumped into a tank reactor to stir, wherein flow rates of the solutions A and B were respectively 10 mL/min and 16 mL/min, a reaction temperature was 80° C., and the reaction lasted for 1.5 hours. After the reaction was finished, the solution C was added into the tank reactor, wherein a flow rate of the solution C was 25 mL/min, the temperature was raised to 120° C., and the reaction lasted for 2.5 hours. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 550 mL of dichloroethane to obtain a solution D, and 188.6 g of epoxypropane and 0.25 g of caesium carbonate aqueous solution (40 wt. %) were dissolved in 700 mL of dichloroethane to obtain a solution E. The solution D and the solution E were respectively and simultaneously pumped into a tank reactor to stir at a reaction temperature of 120° C. for 3 hours, wherein flow rates of the solutions D and E were respectively 30 mL/min and 10 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 83 mgKOH/g and a viscosity of 2610 mPa·s.

(2) Preparation of polyurethane elastomer

Under the protection of nitrogen, a polyurethane elastomer was prepared by a prepolymer method, 100 g of cotton-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a cotton oil-based polyurethane elastomer.

Comparative Example 3

(1) Preparation of polyurethane polyol

The preparation method of the polyurethane polyol was the same as that of Embodiment 1, but different in that, in the Comparative Example 3, the reaction was terminated after the vegetable oil polyol was obtained by performing ring-opening reaction between the hydroxyl compound and the epoxy vegetable oil.

25.2 g of 2,3-epoxybutane and 12.30 g of fluoroboric acid aqueous solution (40 wt. %) were dissolved in 85 mL of dichloroethane to obtain a mixed solution A, 52.5 g of triethylene glycol was dissolved in 190 mL of dichloroethane to obtain a solution B, and 100 g of epoxy soybean oil (0.406 mol of epoxy group) was dissolved in 300 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.5 mL/min, 0.9 mL/min, 1.0 mL/min and 1.0 mL/min; a volume of the first microreactor in a microchannel reaction device was 10 mL, a reaction temperature was 80° C., and a reaction residence time was 7 minutes; a volume of the second microreactor in the microchannel reaction device was 20 mL, a reaction temperature was 120° C., and a reaction residence time was 10 minutes. The product after the reaction was finished was introduced into a separator to stand for stratification, then an oleic phase was collected, washed to neutrality, separated, and the organic phase was subjected to rotary evaporation to obtain the polyurethane polyol which had a hydroxyl value of 140 mgKOH/g and a viscosity of 1770 mPa·s.

(2) Preparation of polyurethane elastomer

Under the protection of nitrogen, a polyurethane elastomer was prepared by a prepolymer method, 100 g of soybean-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then 100 g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a soybean oil-based polyurethane elastomer.

Comparative Example 4

The preparation method of the polyurethane polyol was the same as that of Embodiment 1, but different in that, in the Comparative Example 4, the hydroxyl compound was synthesized by replacing 2,3-epoxybutane with 1,2-epoxybutane only.

(1) Preparation of polyurethane olyol 25.2 g of 1,2-epoxybutane and 12.30 g of fluoroboric acid aqueous solution (40 wt. %) were dissolved in 85 mL of dichloroethane to obtain a mixed solution A, 52.5 g of triethylene glycol was dissolved in 190 mL of dichloroethane to obtain a solution B, and 100 g of epoxy soybean oil (0.406 mol of epoxy group) was dissolved in 300 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.5 mL/min, 0.9 mL/min, 1.0 mL/min and 1.0 mL/min; a volume of the first microreactor in a microchannel reaction device was 10 mL, a reaction temperature was 80° C., and a reaction residence time was 7 minutes; a volume of the second microreactor in the microchannel reaction device was 20 mL, a reaction temperature was 120° C., and a reaction residence time was 10 minutes. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 600 mL of dichloroethane to obtain a solution D, and 235.8 g of epoxypropane and 0.2 g of caesium carbonate aqueous solution (40 wt. %) were dissolved in 800 mL of dichloroethane to obtain a solution E. The solution D and the solution E were respectively and simultaneously pumped into a tank reactor to stir at a reaction temperature of 130° C. for 3 hours, wherein flow rates of the solutions D and E were respectively 40 mL/min and 15 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 54 mgKOH/g and a viscosity of 3210 mPa·s.

(2) Preparation of polyurethane elastomer

Under the protection of nitrogen, a polyurethane elastomer was prepared by a prepolymer method, 100 g of soybean-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then 100 g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a soybean oil-based polyurethane elastomer.

Comparative Example 5

The preparation method of the polyurethane polyol was the same as that of Embodiment 1, but different in that, in the Comparative Example 5, the hydroxyl compound was synthesized by replacing triethylene glycol with propylene glycol.

(1) Preparation of polyurethane polyol 25.2 g of 2,3-epoxybutane and 12.30 g of fluoroboric acid aqueous solution (40 wt. %) were dissolved in 85 mL of dichloroethane to obtain a mixed solution A, 26.63 g of 1,3-propylene glycol was dissolved in 100 mL of dichloroethane to obtain a solution B, and 100 g of epoxy soybean oil (0.406 mol of epoxy group) was dissolved in 300 mL of dichloroethane to obtain a solution C. The mixed solution A and the solution B were respectively and simultaneously pumped into a first micromixer, fully mixed and then introduced into a first microreactor for reaction to obtain a reaction effluent containing a hydroxyl compound; the reaction effluent containing the hydroxyl compound and the solution C were respectively and simultaneously pumped into a second micromixer, fully mixed and then introduced into a second microreactor for ring-opening reaction to obtain a reaction effluent containing vegetable oil polyol. Flow rates of the solutions A and B, an effluent of the first microreactor and the solution C were respectively 0.5 mL/min, 0.5 mL/min, 1.0 mL/min and 1.0 mL/min; a volume of the first microreactor in a microchannel reaction device was 8 mL, a reaction temperature was 80° C., and a reaction residence time was 8 minutes; a volume of the second microreactor in the microchannel reaction device was 20 mL, a reaction temperature was 120° C., and a reaction residence time was 10 minutes. The product after the reaction was finished was introduced into a separator to stand for stratification, then an oleic phase was collected, washed to neutrality, and then the vegetable oil polyol was obtained by liquid separation and rotary evaporation. The obtained vegetable oil polyol was dissolved in 600 mL of dichloroethane to obtain a solution D, and 235.8 g of epoxypropane and 0.2 g of caesium carbonate aqueous solution (40 wt. %) were dissolved in 800 mL of dichloroethane to obtain a solution E. The solution D and the solution E were respectively and simultaneously pumped into a tank reactor to stir at a reaction temperature of 130° C. for 3 hours, wherein flow rates of the solutions D and E were respectively 40 mL/min and 15 mL/min. The product after finishing the reaction was stood for stratification, and an oleic phase was collected and washed with 5 wt. % HCl for neutralization until a pH value was 6.5 to 7.5, then liquid separation was carried out, and an organic phase was subjected to rotary evaporation, and then dried to obtain the polyurethane polyol which had a hydroxyl value of 62 mgKOH/g and a viscosity of 970 mPa·s.

(2) Preparation of polyurethane elastomer

Under the protection of nitrogen, a polyurethane elastomer was prepared by a prepolymer method, 100 g of soybean-based polyurethane polyol was mixed with 1.5 g of water, 1.0 g of silicone oil, 2 g of cell-opening agent, 0.3 g of catalyst A-33, 0.1 g of catalyst A-1 and 0.006 g of catalyst T-12, and then 100 g of 4,4'-diphenylmethane diisocyanate was added for reaction at 80° C. for 2 hours. A free NCO content in the reaction system was determined by a di-n-butylamine method, and then 1,4-butylene glycol was added according to a chain extension coefficient of 0.95. After stirring and mixing evenly, the mixture was poured into a flat steel mold at 100° C., vulcanized and aged for 24 hours in an oven at 90° C., thus obtaining a soybean oil-based polyurethane elastomer.

Comparative Example 6

The polyurethane polyol was prepared according to a polyurethane polyol and a preparation method thereof of CN109369871A and using the method in Embodiment 2, wherein the polyurethane polyol has a hydroxyl value of 75 mgKOH/g and a viscosity of 950 mPa·s. The prepared polyurethane polyol was used to prepare a polyurethane elastomer according to the method in Embodiment 1.

Performance indexes of the polyurethane polyols prepared in Embodiments 1 to 6 and Comparative Examples 1 to 6 are shown in Table 1, and performance indexes of the polyurethane elastomers prepared are shown in Table 2.

TABLE 1

Performance indexes of polyurethane polyol

| Performance index | Embodiment | | | | | | Comparative example | | | | | |
|---|---|---|---|---|---|---|---|---|---|---|---|---|
| | 1 | 2 | 3 | 4 | 5 | 6 | 1 | 2 | 3 | 4 | 5 | 6 |
| Hydroxyl value (mgKOH/g) | 41 | 47 | 37 | 35 | 40 | 45 | 74 | 83 | 140 | 54 | 62 | 75 |
| Viscosity (mPa · s/25° C.) | 710 | 620 | 770 | 810 | 690 | 690 | 2120 | 2210 | 1770 | 3210 | 970 | 950 |

TABLE 2

| | Performance indexes of polyurethane elastomer | | | | | | | | | | | |
|---|---|---|---|---|---|---|---|---|---|---|---|---|
| | Embodiment | | | | | | Comparative example | | | | | |
| Performance index | 1 | 2 | 3 | 4 | 5 | 6 | 1 | 2 | 3 | 4 | 5 | 6 |
| Tensile strength (kPa) | 134 | 127 | 139 | 138 | 135 | 136 | 111 | 110 | 77 | 83 | 105 | 120 |
| Elongation percentage (%) | 137 | 144 | 145 | 143 | 129 | 145 | 121 | 124 | 101 | 95 | 110 | 105 |
| Compression set parameter (%) | 10 | 9 | 9 | 10 | 10 | 9 | 15 | 16 | 18 | 23 | 15 | 16 |
| Rebound performance(s) | 12 | 13 | 15 | 12 | 12 | 14 | 10 | 10 | 8 | 6 | 10 | 8 |
| Tear strength (Ncm$^{-1}$) | 8 | 9 | 9 | 8 | 8 | 9 | 7 | 7 | 5 | 5 | 7 | 8 |

The present invention provides the polyurethane polyol and the preparation method thereof and application ideas and methods. There are many methods and ways to realize the technical solutions. The above is only the preferred embodiments of the present invention. It should be pointed out that those of ordinary skills in the art can make some improvements and embellishments without departing from the principle of the present invention, and these improvements and embellishments should also be regarded as falling with the scope of protection of the present invention. All the unspecified components in the embodiments can be realized by the prior art.

What is claimed is:

1. A preparation method of a polyol, comprising the following steps of:
   (1) dissolving 2,3-epoxybutane and an acid catalyst in an inert solvent to obtain a solution A; dissolving triethylene glycol in an inert solvent to obtain a solution B; and dissolving epoxy vegetable oil in an inert solvent to obtain a solution C;
   (2) respectively and simultaneously pumping the solution A and the solution B into a first micromixer in a microchannel reaction device for mixing, and then introducing the mixture into a first microreactor for reaction to obtain a reaction solution containing a hydroxyl compound;
   (3) respectively and simultaneously pumping the solution C and an effluent of the first microreactor into a second micromixer in the microchannel reaction device for mixing while carrying out step (2), and then introducing the mixture into a second microreactor for reaction to obtain a reaction solution containing a vegetable oil polyol, and then separating the solution to obtain the vegetable oil polyol; and
   (4) dissolving the vegetable oil polyol obtained in step (3) in an inert solvent to obtain a solution D; dissolving epoxypropane and an alkaline catalyst in an inert solvent to obtain a solution E; and respectively and simultaneously pumping the solution D and the solution E into a tank reactor for reaction, thereby obtaining the polyol;
   wherein the polyol is capable of being used for preparing a polyurethane.

2. The preparation method of the polyol according to claim 1, wherein in step (1), a molar ratio of the 2,3-epoxybutane to the acid catalyst in the solution A is (1.0 to 1.25):(0.1 to 0.2), and a concentration of the 2,3-epoxybutane is 2.20 mmol/mL to 4.50 mmol/mL.

3. The preparation method of the polyol according to claim 1, wherein in step (1), a concentration of the triethylene glycol in the solution B is 1.20 mmol/mL to 3.0 mmol/mL.

4. The preparation method of the polyol according to claim 1, wherein in step (1), a concentration of the epoxy vegetable oil in the solution C is 0.15 mmol/mL to 0.40 mmol/mL.

5. A polyol prepared by the method according to claims 1.

* * * * *